United States Patent
Battisti

(10) Patent No.: US 7,073,312 B2
(45) Date of Patent: Jul. 11, 2006

(54) DEVICE FOR TRANSFERRING ARTICLES IN A CONTROLLED CONFIGURATION FROM A FEEDING LINE TO A RECEIVING LINE

(75) Inventor: Antonio Battisti, Latina (IT)

(73) Assignee: Packservice S.r.l., Latina (IT)

( * ) Notice: Subject to any disclaimer, the term of this patent is extended or adjusted under 35 U.S.C. 154(b) by 63 days.

(21) Appl. No.: 11/011,934

(22) Filed: Dec. 14, 2004

(65) Prior Publication Data

US 2005/0126115 A1   Jun. 16, 2005

(30) Foreign Application Priority Data

Dec. 16, 2003   (IT) ........................ BO2003A0753

(51) Int. Cl.
*B65B 35/36* (2006.01)
*B65B 35/40* (2006.01)

(52) U.S. Cl. .................. 53/537; 53/543; 53/252; 198/468.3

(58) Field of Classification Search ........... 53/537, 53/252; 198/468.3
See application file for complete search history.

(56) References Cited

U.S. PATENT DOCUMENTS

| | | | |
|---|---|---|---|
| 3,685,624 A * | 8/1972 | Paddock | .................. 193/7 |
| 3,729,888 A | 5/1973 | Carle | |
| 4,788,812 A | 12/1988 | Morita et al. | |
| 4,832,180 A * | 5/1989 | Ferrero | .................. 198/468.3 |
| 4,902,184 A * | 2/1990 | Fritz | .................. 414/790.3 |
| 4,939,891 A * | 7/1990 | Podini | .................. 53/496 |
| 5,575,376 A * | 11/1996 | Colamussi | .................. 198/468.3 |
| 5,611,193 A * | 3/1997 | Farrelly | .................. 53/475 |
| 6,070,385 A | 6/2000 | Antonio | |
| 6,574,943 B1* | 6/2003 | Van Dam | .................. 53/447 |
| 6,964,150 B1* | 11/2005 | Battisti | .................. 53/541 |

FOREIGN PATENT DOCUMENTS

EP   1314645 A1   11/2002

OTHER PUBLICATIONS

WO 00/68086.

* cited by examiner

*Primary Examiner*—John Sipos
(74) *Attorney, Agent, or Firm*—William J. Sapone; Coleman Sudol Sapone P.C.

(57) ABSTRACT

In a device for transferring articles in a controlled configuration from a feeding line to a receiving line, an oscillating arm having suction grippers picks up the articles, arranged in a first configuration, at an inlet station and transfer the articles up to an outlet station. The oscillating arm and grippers release the articles at the outlet station in a second configuration. A plurality of collecting compartments receive the articles in the second configuration. During transferring, guiding cams cooperate with the grippers for changing uniformly the distance between the articles from the first configuration to the second configuration. Pushers convey then the articles in the collecting compartments into seats made in the receiving line.

16 Claims, 5 Drawing Sheets

DEVICE FOR TRANSFERRING ARTICLES IN A CONTROLLED CONFIGURATION FROM A FEEDING LINE TO A RECEIVING LINE

TECHNICAL FIELD

The present invention relates to automatic packaging of articles in general, for example the so-called strip packages, envelopes and the like.

In this specific case, the present invention relates to a device for transferring articles in a controlled configuration from a feeding line to a receiving line, the latter being connected to a boxing machine.

BACKGROUND OF THE INVENTION

One of the most frequently reported necessities in the technical field concerned is possibility of transferring the articles released by a packaging machine, in a controlled configuration, to a receiving line connected to a boxing machine.

The common problem lies in adjusting the configuration of the articles released by the packaging machine to the distance between the seats of the receiving line, which are dimensioned in relation to the articles size.

Another problem relates adapting the height of the outlet of the articles released by the packaging machine to the height imposed by the receiving line for feeding the boxing machine.

If the articles are obtained by cutting from a continuous strip, as in case of the so-called strip packages, there is another problem connected with possible curving of the strip near the cutting means.

The object of the present invention is to propose a device for transferring articles in a controlled configuration from a feeding line to a receiving line, which device is capable of supplying articles in a controlled configurations, varying within a wide range, to any boxing machine, in a particularly flexible and efficient way.

Another object of the present invention is to propose a device which is extremely functional and reliable and which supplies articles in a controlled configurations independently from the heights of the corresponding lines, feeding and receiving lines, and from the operation modes, continuous or stepwise, of the feeding line.

A further object of the present invention is to propose a particularly compact device, whose installation and maintenance are especially simple and easy.

A still further object of the present invention is to propose a device, which ensures high production rates in any operation conditions, and which can be connected in cascade to any packaging machine in an extremely rapid and intuitive way.

SUMMARY OF THE INVENTION

The above mentioned objects are obtained, in accordance with the contents of the claims, by a device for transferring articles in a controlled configuration from a feeding line to a receiving line, with the feeding line supplying an inlet station with the articles arranged in a first configuration and the receiving line supplying, in particular, a boxing machine, the device including:

oscillating means moving to-and-fro between said feeding line and receiving line, in step relation with motion of said articles along said feeding line;

gripping means connected to said oscillating means and operated in step relation with said oscillating means and with motion of said articles along said feeding line, for picking up articles arranged in said first configuration at said inlet station, and for transferring said articles up to an outlet station, where the articles are released arranged according to a second configuration, with a same spatial orientation as said first configuration;

a plurality of collecting compartments, situated at said outlet station for receiving said articles in said second configuration;

guiding means cooperating with said gripping means for changing uniformly distance between said articles during transition from said inlet station to said outlet station, where said distance corresponds to mutual spacing of said collecting compartments;

pusher means, situated at said outlet station and operated in step relation with said oscillating means for conveying the articles positioned in said collecting compartments into seats made in said receiving line.

BRIEF DESCRIPTION OF THE DRAWINGS

The characteristic features of the invention will be pointed out in the following description of some preferred but not exclusive embodiments, with reference to the enclosed figures, in which:

FIG. 4 is a schematic, section view, taken along IV—IV of FIG. 3a;

DESCRIPTION OF THE PREFERRED EMBODIMENTS

Figure 1:
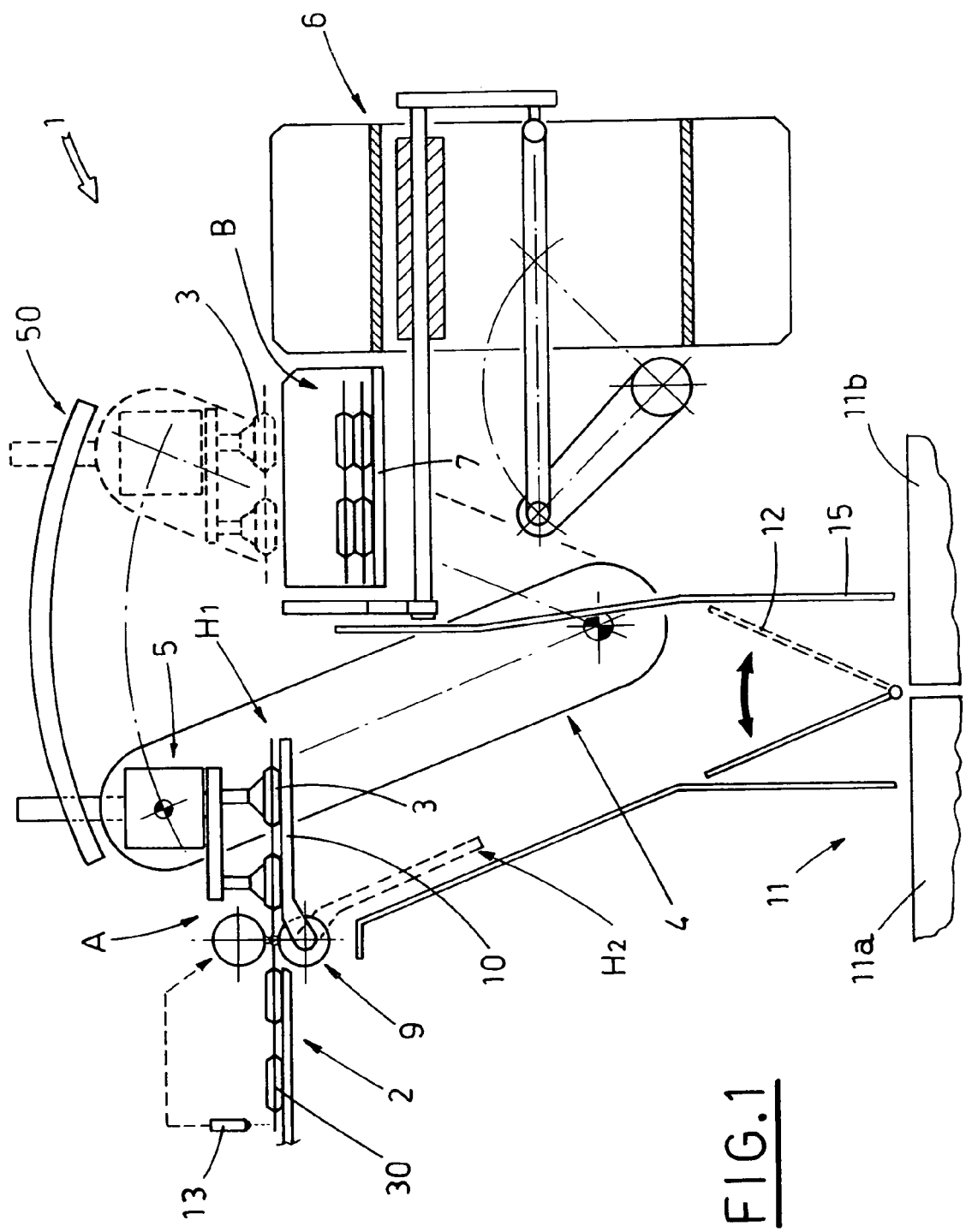
FIG. 1 is a schematic, lateral view of the device proposed by the invention, according to a particular embodiment, in some extremely significant operation steps.
Figure 2:
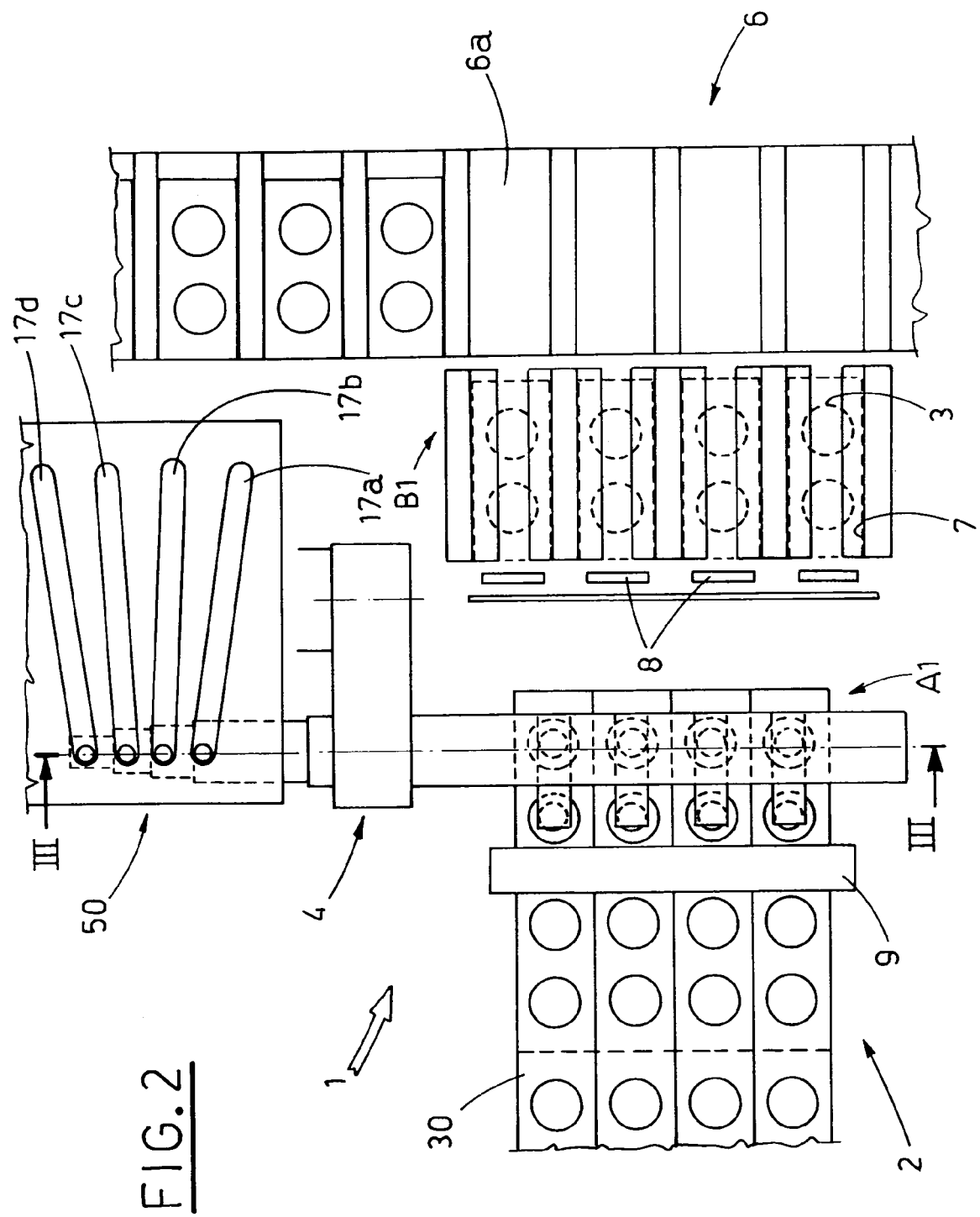
FIG. 2 is a schematic, top view of the device shown in FIG. 1.
Figure 3:
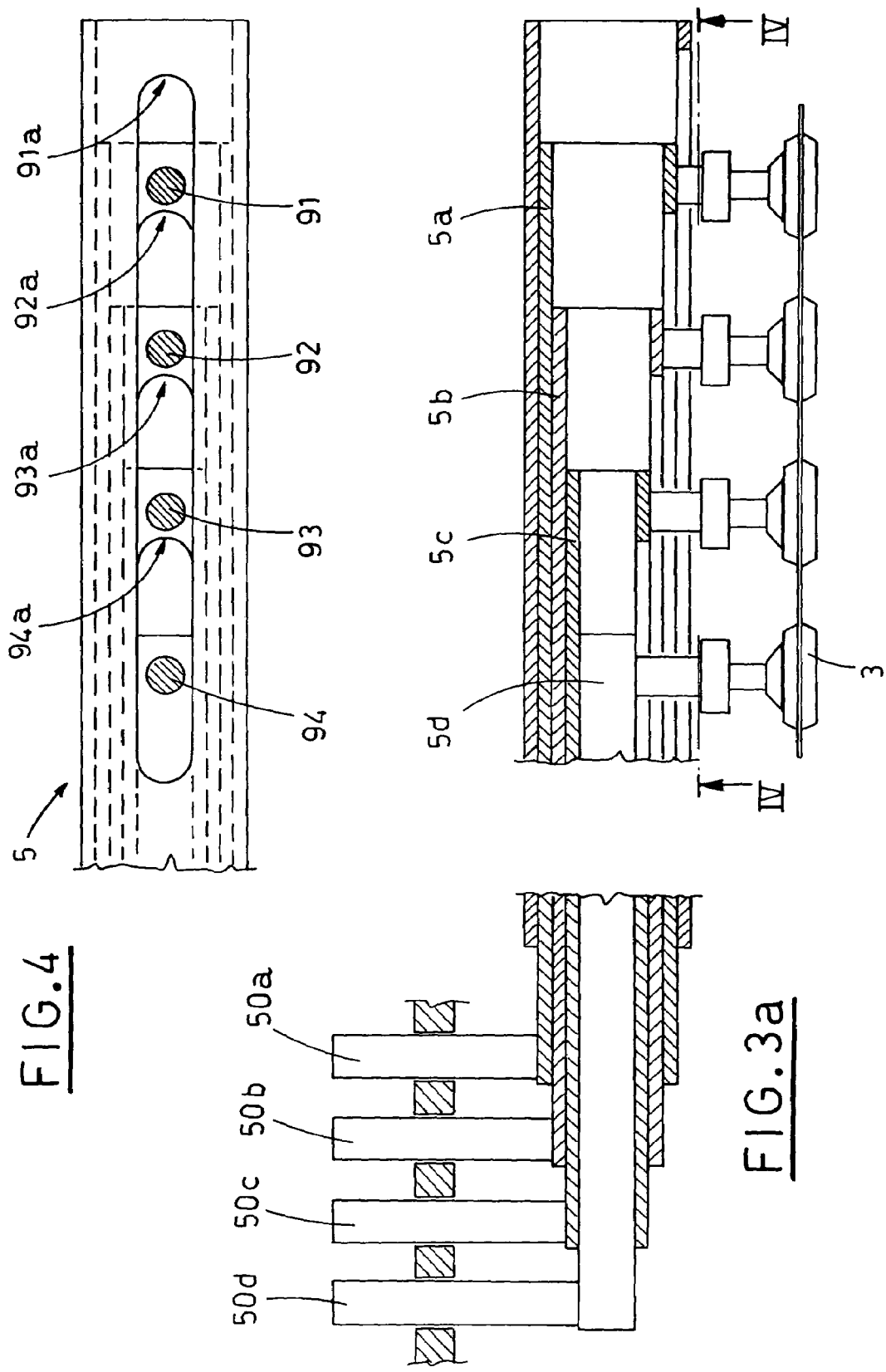
FIG. 3a is a schematic, enlarged section view taken along the III—III of FIG. 2 in a first operation step.
FIG. 3b is a schematic, further enlarged section view taken along the same III—III of FIG. 2, in a second operation step.
Figure 4:
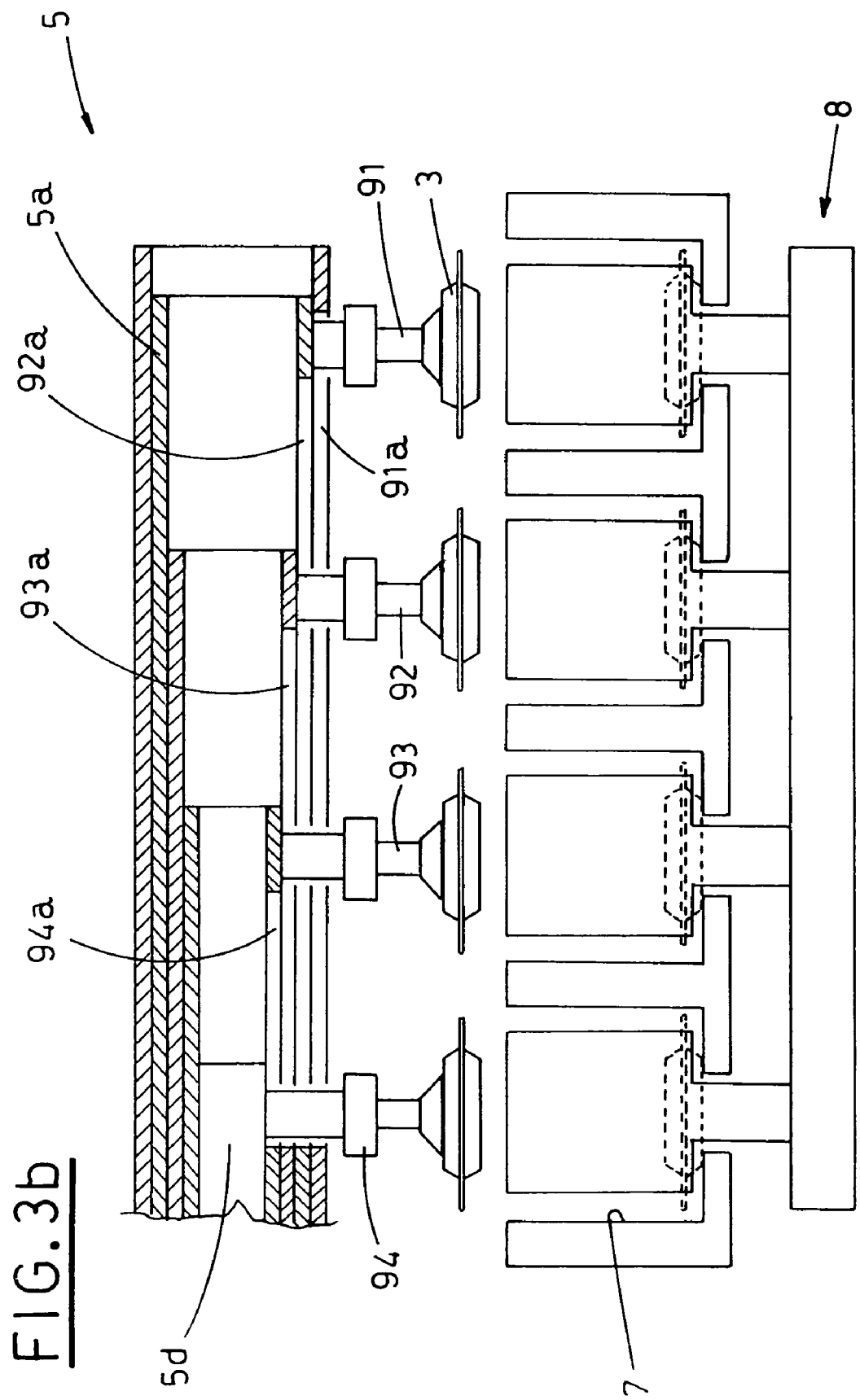

With reference to the above Figures, general reference numeral 1 indicates the proposed device for transferring articles 3 in a controlled configuration from a feeding line 2 to a receiving line 6, in particular for feeding a boxing machine.

As a mere example, the enclosed figures refer to articles 3, which are strip packages obtained from a continuous band 30 of welded blisters, cut longitudinally, which is cut by means 9 for crosswise cutting of the band 30, situated upstream of the inlet section A of the device 1 proposed by the invention.

In known way, the crosswise cutting means 9 include two rolls, an upper roll and a lower roll, which are driven into rotation, in step relation with the feeding line 2, so as to release strip packages 3 to the inlet station A, mutually arranged in such a way, as to define a first configuration A1, in which they are set one beside another, coplanar and oriented along a substantially horizontal plane.

Advantageously, according to a preferred but not unique embodiment, the strip packages 3 are released to the inlet station A in a continuous way.

In particular, in known way, the cutting means 9 are operated in accordance with signals coming from means 13 for detecting the moving step of the continuous band 30 of welded blisters.

The receiving line 6, for feeding a boxing machine, is arranged at an angle with respect to the feeding line 2, in particular it can be oriented longitudinally or crosswise thereto.

Advantageously, the proposed device 1 includes an oscillating arm 4 having a plurality of gripping means 5, operated in step relation with the cutting means 9, to pick up strip packages 3 in the first configuration A1, in the region of the inlet station A, and to transfer them up to an outlet station B, where the strip packages 3 are released, arranged mutually in such a way, as to define a second configuration B1.

The strip packages in the second configuration B1 have the same orientation as in the the first configuration A1, that is the packages are spaced apart and coplanar, oriented along a horizontal plane.

In a known way, the oscillating arm 4 transfers the strip packages 3 from the first configuration A1 to the second configuration B1, maintaining the same spatial arrangement thereof, along a horizontal plane.

In the proposed embodiments, the outlet section B is situated at a slightly lower level with respect to the inlet station A, for example 50 mm lower.

This does not exclude that the outlet section B can be situated substantially coplanar with or higher than the inlet station A.

The device 1 proposed by the invention includes, at the outlet station B, a plurality of collecting compartments 7, which receive the strip packages 3 in the second configuration B1.

The collecting compartments 7 have the bottoms substantially coplanar with the receiving line 6 and they are spaced apart by a fixed or variable distance corresponding to the distance between the seats 6a made in the receiving line 6.

The gripping means 5 carried by the oscillating arm 4 cooperate with suitable guiding means 50, which vary uniformly the distance between the gripping means during the transition from the first configuration A1 to the second configuration B1, where the distance corresponds to the mutual spacing of the collecting compartments 7.

The proposed device 1 includes, at the outlet station B, pusher means 8, operated in step relation with the oscillating arm 4, to convey the strip packages 3 situated in the collecting compartments 7 into the relative seats 6a made in the receiving line 6.

The pusher means 8 are operated when the desired number of strip packages 3 are present inside the corresponding collecting compartments 7.

A support member is situated at the inlet station A, to receive the strip packages 3 released by the cutting means 9. The support member moves from a waiting position H1, in which it supports the strip packages 3 in the first configuration A1, to an inclined position H2, in which it releases the strip packages 3 to a guiding channel 15 situated below and opening into a collecting container 11.

The device 1 includes also deflecting means 12, which are connected to the guiding channel 15 and send the strip packages 3, released by the support member, into rooms 11a, 11b made in the collecting container 11.

For example, a first room 11a can receive empty and/or half-empty strip packages 3, that is with non-entire articles inside the blisters, while a second room 11b can receive entire strip packages 3, e.g. for samples test.

With particular reference to FIG. 1, according to a first embodiment, the support member includes an oscillating plane 10 rotated by first driving means 10a, between the waiting position H1 and the inclined position H2, when enabled by means (not shown, since widely known), connected to the feeding line 2, for controlling and checking the entireness of the strip packages 3.

Figure 5:
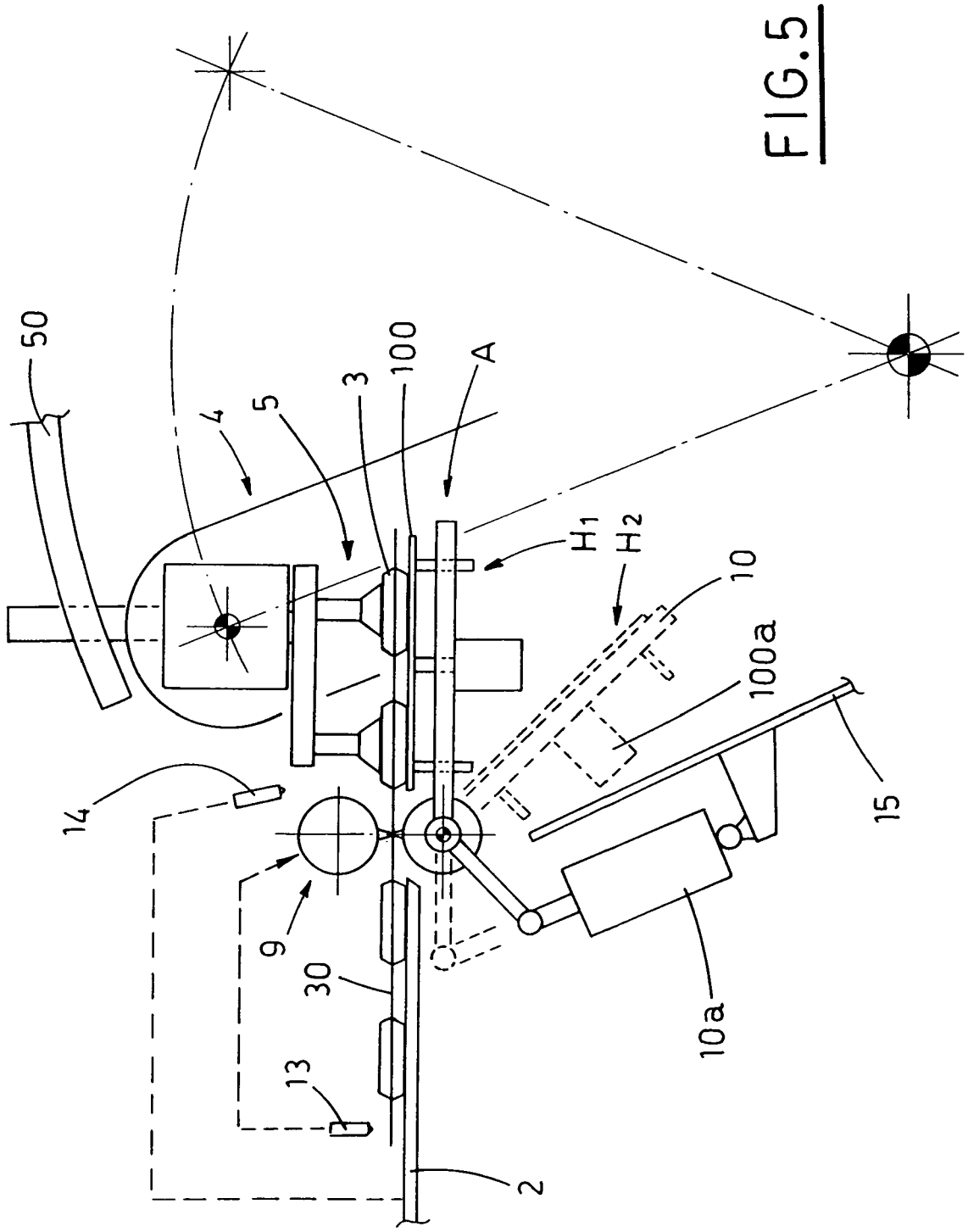
FIG. 5 is a schematic, lateral, enlarged view of the device shown in FIG. 1, according to another embodiment.

With particular reference to FIG. 5, related to a second embodiment, the device 1 proposed by the present invention includes blowing means 14, situated near the inlet station A, operated in step relation with the cutting means 9 to send an air-jet to the strip packages 3 present in the inlet station A in the first configuration A1.

The oscillating plane 10 carries a bearing plane 100 aimed at receiving strip packages 3 released from the feeding line 2, this bearing plate being operated by second driving means 100a, in step relation with the blowing means 14, to bring the strip packages 3 to the first configuration A1 near to the gripping means 5, against the action of the blowing means 14.

For example, the bearing plane 100 can reach a maximum excursion of 10 mm with respect to the oscillating plane 10, with the latter being in waiting position H1.

With particular reference to FIGS. 2, 3a, 3b and 4, the guiding means 50 include a plurality of curved cams 17a, 17b, 17c, 17d, aimed at interacting with the respective gripping means 5, so as to change the distance between the latter during the transition between the first configuration A1 and the second configuration B1.

The gripping means 5 include corresponding control shafts 5a, 5b, 5c, 5d, having tubular shape, coaxial with one another, and carrying at one end suction means, which are connected to a source of vacuum, in step relation with the operation of the oscillating arm 4, and which have, at the other end, respective pins 50a, 50b, 50c, 50d, engaging with the corresponding curved cams 17a, 17b, 17c, 17d to cause longitudinal sliding of the tubular shafts 5a, 5b, 5c, 5d.

Now, the operation of the proposed device 1 will be described briefly by way of example, according to its second embodiment shown in FIG. 5, with reference to a general operation step, in which the blowing means 14 are disabled and do not supply an air-jet, in which the gripping means 5 are waiting and disabled, that is they are not connected to the source of vacuum, at the inlet station A, and in which the oscillating plane 10 is in waiting position H1, with the bearing plane 100 set in contact with it.

The feeding line 2 brings the leading end of the continuous band 30 of welded blisters to the inlet station A of the device 1.

The blowing means 14 are enabled at that time, to maintain the continuous band 30 against the bearing plane 100, so as to avoid curving of the band upwards.

The second activating means 100a operate the bearing plane 100, in step relation with activation of the blowing means 14, so as to bring the leading end of the continuous band 30, located at the inlet station A, to the gripping means 5, against the action of the blowing means 14.

The gripping means 5 are then enabled, that is connected to the source of vacuum, in step relation with the movement of the bearing plane 100, so as to ensure the gripping of the leading end of the continuous band 30.

In step relation with the above activation, the cutting means 9 cut the continuous band 30 crosswise, to define a plurality of strip packages 3 in the first configuration A1, in which they are arranged on a horizontal plane, one beside another and coplanar.

In step relation with the activation of the cutting means 9, the oscillating arm 4 transfers the strip packages 3 up to the outlet station B, releasing them inside the relative collecting compartments 7 in the second configuration B1, still coplanar but spaced crosswise.

During the oscillating arm 4 movement, the driving shafts 5a, 5b, 5c, 5d engage with the relative pins 50a, 50b, 50c, 50d inside the corresponding curved cams 17a, 17b, 17c, 17d, thus causing the change of the distance between the gripping means 5, which in the outlet station B correspond to the distance defined by the collecting compartments 7.

When a predetermined number of strip packages 3 is reached inside each collecting compartment 7, the pusher means 8 are operated to convey the strip packages 3 to the seats 6a made in the opposite receiving line 6.

If the means for checking the entireness of the articles present in the welded blisters of the continuous band 30 find anomalies, for example empty blisters or not entire articles, the first activating means 10a operate, in step relation with the cutting means 9, the transition of the oscillating plane 10, together with the associated bearing plane 100, in the inclined position H2, and the gripping means 5 are kept disabled, that is maintained disconnected from the vacuum source.

This allows to convey the strip packages 3 into the guiding channel 15 and, by suitably operating the deflecting means 12, to send subsequently the strip packages 3 to the prefixed first room 11a, aimed at receiving the empty strip packages 3, and/or half-empty, that is with non-entire articles therein.

In a general operation step of the device 1 proposed by the invention, it is possible to control by sampling the strip packages 3, by operating forcedly the transition of the oscillating plane 10 to the inclined position H2, independently from the signal coming from the means for control and check of the articles entireness.

By operating suitably the deflecting means 12, this allows to collect the strip packages 3 checked as entire, in the prefixed second room 11b, to verify their effective entireness degree.

The working way of the device 1 in its first embodiment (FIGS. 1, 2) derives clearly from what has been written above with reference to the second embodiment (FIG. 5).

Actually, in this case, the feeding line 2 brings the leading end of the continuous band 30 to the inlet station A, where it lies freely on the oscillating plane 10 in waiting position H.

In step relation with the feeding of the inlet station A, the gripping means 5 are operated and the cutting means 9 cut crosswise the continuous band 30, to define a plurality of strip packages 3 in the first configuration A1.

Then, the oscillating arm 4 moves the strip packages 3 up to the outlet station B, into the relative collecting compartments 7, in which they are released in the second configuration B1.

From what above, it is understood how the proposed device can transfer articles, for example, strip packages, in controlled configuration, from a feeding line to a receiving line, arranged at an angle thereto, to feed a boxing machine.

Actually, in relation to the machine desired layout, the receiving line can be oriented longitudinally (in line configuration) or crosswise (90° configuration) with respect to the feeding line.

The proposed device allows to transfer articles (indifferently tablets, capsules, pills, or strip packages) in a controlled configuration into correspondingly dimensioned seats made in the receiving line, with the latter being in any configuration (in line or 90°), allowing the direct feeding of a boxing machine, without interposing any expensive apparatus.

In case of articles deriving from the cutting of a continuous band, as in case of strip packages, it is suitable to use the second embodiment, which solves easily the problems connected with possible curving of the band near the cutting means, which is extremely difficult in case of continuous feeding of the band.

Consequently, the proposed device can ensure high reliability and production rate standards in any operation conditions, and can be connected, in extremely rapid and intuitive way, to the outlet sections of any packaging machine, irrespective of the heights of the feeding line and of the receiving line.

The extreme constructive simplicity and best compactness of the proposed device ensures particularly simple and easy installation and maintenance operations.

What is claimed is:

1. A device for transferring articles in a controlled configuration from a feeding line to a receiving line, with the feeding line supplying an inlet station with the articles arranged in a first configuration and the receiving line supplying a boxing machine, the device including:
    oscillating means moving to-and-fro between said feeding line and receiving line, in step relation with motion of said articles along said feeding line;
    gripping means connected to said oscillating means and operated in step relation with said oscillating means and with motion of said articles along said feeding line, for picking up articles arranged in said first configuration at said inlet station, and for transferring said articles up to an outlet station, where the articles are released arranged according to a second configuration, with a same spatial orientation as said first configuration;
    a plurality of collecting compartments, situated at said outlet station for receiving said articles in said second configuration;
    guiding means cooperating with said gripping means for changing uniformly distance between said articles during transition from said inlet station to said outlet station, where said distance corresponds to mutual spacing of said collecting compartments;
    pusher means, situated at said outlet station and operated in step relation with said oscillating means for conveying the articles positioned in said collecting compartments into seats made in said receiving line.

2. A device, as claimed in claim 1, further including at least one support member, which is situated in said inlet station for receiving articles released by said feeding line, said support member moving from a waiting position, in which it supports the articles in said first configuration, to an inclined position, in which it releases said articles to a guiding channel opening into at least one collecting container.

3. A device, as claimed in claim 2, further including deflecting means, which are connected to said guiding channel and which send said articles released by said support member into rooms of said collecting container.

4. A device, as claimed in claim 2, further including, near said inlet station, blowing means, operated in step relation with said feeding line for ejecting an air-jet onto the articles present in said inlet station in said first configuration, so as to maintain them substantially coplanar and touching said support member in said waiting position.

5. A device, as claimed in claim 2, wherein said support member includes an oscillating plane, operated between said waiting position and inclined position, by first driving means, when enabled by means connected to said feeding line for controlling and checking the entireness of the articles.

6. A device, as claimed in claim 5, wherein said support member includes at least one bearing plane, carried by said oscillating plane for receiving articles released by said feeding line, said bearing plane being operated by second driving means, in step relation with said blowing means, to bring said articles in first configuration to said gripping means, against the action of the blowing means.

7. A device, as claimed in claim 1, further including cutting means, situated upstream of said inlet station, operated in step relation with the feeding line, with which it cooperates to release the articles in said first configuration to said inlet station.

8. A device, as claimed in claim 7, further including means, connected to said feeding line for detecting the transfer step of said articles and interacting with said cutting means.

9. A device, as claimed in claim 1, wherein said guiding means include a plurality of cams, substantially curved, interacting with said gripping means, so as to change the distance between the gripping means during the transition between said first configuration and said second configuration.

10. A device, as claimed in claim 9, wherein said gripping means include corresponding tubular driving shafts, in substantial coaxial relation with one another, which carry, at one end suction means connected, when said oscillating means are operated, to a vacuum source, and having, at the other end, respective pins, which engage with said curved cams, to make said tubular driving shafts slide longitudinally.

11. A device, as claimed in claim 1, wherein said inlet station is situated lower than said outlet station.

12. A device, as claimed in claim 1, wherein said inlet station is situated higher than said outlet station.

13. A device, as claimed in claim 1, wherein said inlet station is substantially coplanar with said outlet station.

14. A device, as claimed in claim 1, wherein said receiving line is arranged at an angle with respect to said feeding line.

15. A device, as claimed in claim 1, wherein said receiving line is arranged longitudinally or crosswise with respect to said feeding line.

16. A device, as claimed in claim 1, wherein said feeding line feeds articles in a continuous way.

* * * * *